United States Patent [19]

Menne

[11] Patent Number: 4,631,033
[45] Date of Patent: Dec. 23, 1986

[54] OUTBOARD MOTOR FOOT CONTROL WITH ADJUSTABLE CABLES

[75] Inventor: Eugene P. Menne, Mankato, Minn.

[73] Assignee: Johnson Fishing, Inc., Mankato, Minn.

[21] Appl. No.: 602,774

[22] Filed: Apr. 23, 1984

[51] Int. Cl.⁴ .................... B60L 15/20; B63H 25/00
[52] U.S. Cl. .......................... 440/7; 74/480 B; 74/512; 74/560; 114/153; 254/389
[58] Field of Search ............... 440/6, 7, 62; 114/153; 74/512, 560, 501 R, 480 B; 254/389

[56] References Cited

U.S. PATENT DOCUMENTS

| | | | |
|---|---|---|---|
| 682,347 | 9/1901 | Sims | 74/560 |
| 2,329,529 | 9/1943 | Gwinn, Jr. et al. | 254/389 |
| 2,507,894 | 5/1950 | Dorn, Jr. et al. | 114/153 |
| 2,514,467 | 7/1950 | Black | 440/62 |
| 2,619,846 | 12/1952 | Wales et al. | 74/512 |
| 2,627,833 | 2/1953 | Schroeder | 440/62 |
| 2,629,356 | 2/1953 | Whiting | 114/144 |
| 2,749,872 | 6/1956 | Amick | 114/153 |
| 2,757,630 | 8/1956 | Ottinger | 74/512 |
| 2,804,838 | 9/1957 | Moser | 114/153 |
| 2,838,021 | 6/1958 | West | 114/160 |
| 2,877,733 | 3/1959 | Harris | 114/153 |
| 2,890,595 | 6/1959 | Loeffler | 74/505 |
| 2,901,918 | 9/1959 | Beamer | 74/480 |
| 2,912,877 | 11/1959 | Rohrer | 74/480 |
| 2,968,273 | 1/1961 | Corbett et al. | 114/153 |
| 2,988,037 | 6/1961 | Spencer | 114/153 |
| 2,988,930 | 6/1961 | McMurray et al. | 114/144 X |
| 3,002,398 | 10/1961 | Beamer | 114/153 |
| 3,007,429 | 11/1961 | Sandman | 440/62 X |
| 3,044,312 | 7/1962 | Hall et al. | 74/95 |
| 3,052,204 | 9/1962 | Scivally | 440/6 |
| 3,080,953 | 3/1963 | Edgemond, Jr. | 74/480 |
| 3,095,849 | 7/1963 | Breunich | 440/58 |
| 3,129,605 | 4/1964 | Bonnell, Jr. et al. | 74/560 X |
| 3,136,283 | 6/1964 | Bonnell, Jr. et al. | 440/58 |
| 3,188,882 | 6/1965 | Whitehouse | 74/506 |
| 3,203,270 | 8/1965 | Booth | 74/480 |
| 3,475,985 | 11/1969 | Oldham | 74/512 |
| 3,602,181 | 8/1971 | Harris | 114/153 |
| 3,606,858 | 9/1971 | Edwards et al. | 114/153 |
| 3,659,475 | 5/1972 | Nichols | 74/480 B |
| 3,796,292 | 3/1974 | Harrison | 74/480 X |
| 3,807,345 | 4/1974 | Peterson | 440/7 |
| 3,889,625 | 6/1975 | Roller et al. | 114/153 |
| 4,009,678 | 3/1977 | North | 74/471 R |
| 4,130,079 | 12/1978 | Rhorer et al. | 114/146 |
| 4,266,440 | 5/1981 | Berens | 74/501 R |
| 4,292,859 | 10/1981 | Teraura | 74/505 |
| 4,295,385 | 10/1981 | Huttenhow | 74/478 |
| 4,428,542 | 1/1984 | Kobayashi et al. | 74/505 X |

FOREIGN PATENT DOCUMENTS 673003 10/1963 Canada .................. 254/389

Primary Examiner—Sherman D. Basinger

[57] ABSTRACT

A portable outboard motor foot control device having adjustable cables characterized by a cable house which is adjacent to the foot pedal and from which the cable or cables extend, and a guide through which the cable or cables extend as they exit the cable house, the guide being adjustable to firmly set the direction at which the cable or cables exit the cable house. Preferred embodiments include a drum frictionally held between opposed upright plates forming part of the cable house. Changes in the rotational orientation of the drum change the angle of passageways in the drum through which the cables pass.

18 Claims, 6 Drawing Figures

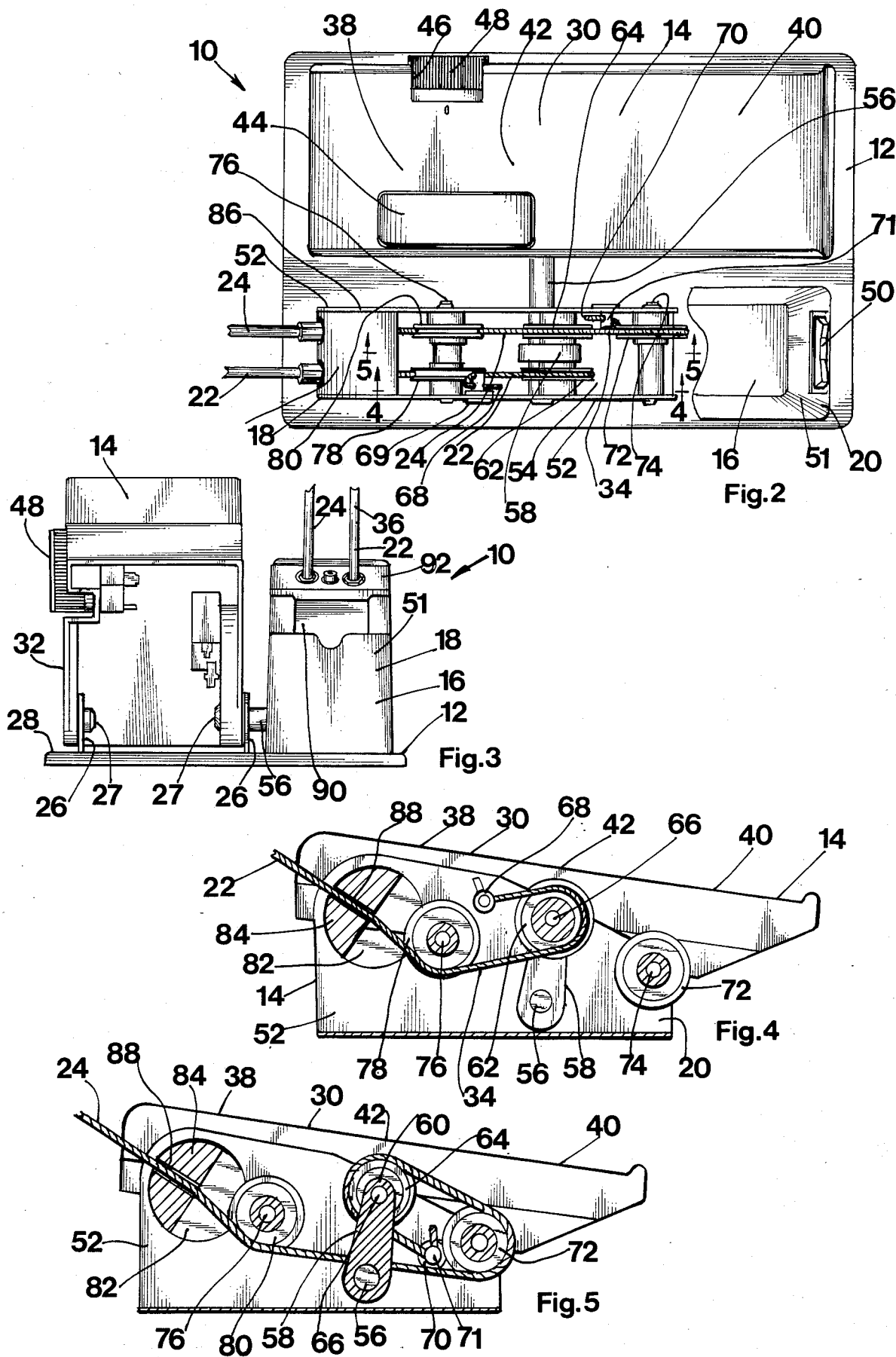

OUTBOARD MOTOR FOOT CONTROL WITH ADJUSTABLE CABLES

FIELD OF THE INVENTION

This invention is related generally to the control of outboard motors for boats and more specifically to portable foot pedal devices used to control outboard motors.

BACKGROUND OF THE INVENTION

Controlling the outboard motors used on fishing boats and the like is a task which may make it more difficult to attend to more enjoyable tasks, like fishing itself. To the extent that a fisherman must occupy his hands and arms in steering or otherwise controlling his boat, he loses the opportunity to concentrate on fishing.

Various foot pedal devices have been used in order to allow operators to control their outboard motors without the use of their hands and arms. Foot pedal devices have been widely used to control electric trolling motors, particularly the bow-mounted trolling motors which have recently become so popular.

A variety of foot pedal devices have been developed, including devices having a single "push-pull" cable and others having two "pull-pull" cables. In either case, each cable has an end secured within the foot pedal device and extending toward the outboard motor which it controls.

Such cables are usually used for steering. In the case of bow-mounted electric trolling motors, the cables are connected to apparatus causing a vertical motor-mounting shaft to turn and thereby change the direction of the motor in the water.

Fisherman using electric trolling motors often want to fish from different parts of their boats, and want to have their foot control devices movable to accommodate their different positions if possible. Because of the increasing popularity of electric trolling motors, recent developments in foot pedal control devices for boats relate primarily to such portable devices. This invention relates to portable foot pedal control devices, which can be easily moved to various locations within the boat to accommodate the needs of the fisherman.

Examples of prior art portable foot controls are those disclosed in the following U.S. Pat. Nos. 2,804,838; 2,877,733; 2,968,273; 3,002,398; 3,602,181; 3,606,858; 3,807,345; 3,889,625; 4,130,079; 4,295,385.

A bothersome problem to fishermen is the fact that prior art foot control devices of the type having cables, despite their portability, are too limited in where they can be placed on the floor of the boat. This limitation is imposed by the cable or cables which extend from the foot control devices to the outboard motor to be controlled. The cables are of necessity somewhat stiff and typically extend from the front of the pedal device. This prevents the operator from placing the foot control device in a forward position close to a bulkhead in his boat.

On the other hand, it is usually undesirable to have cables protruding straight up from the foot control device in the manner which would be necessary to accommodate forward placement against a bulkhead, because in many other situations operators want the cables low against the floor.

Given the number of tackle boxes and the amount of other fishing and related equipment often carried in a fishing boat, there often is little space available on the floor of the boat for a foot control device. And, because of the location and orientation of the cables on the device, the amount of space such devices require is often too large. A more compact foot control device is needed.

It would be very helpful to have increased flexibility in placement of a foot control device in the boat. Improvements are needed in the configuration and/or operation of foot control devices in order to enlarge the area of possible placement of such devices in a boat, or, stated differently, to reduce the amount of floor space such devices require.

BRIEF SUMMARY OF THE INVENTION

This invention is an improved portable foot control device for outboard motors overcoming the aforementioned problems of prior art devices.

The device of this invention is of the type having a base and a pedal pivotably attached to cause the movement of cables. A cable house is secured to the base adjacent to the pedal. Depending on whether the device is a push-pull or a pull-pull system, one or two cables will be secured within the cable house and extend from its forward end toward the controlled outboard motor. On the cable house is an adjustment device which sets the direction at which the cable or cables exit the cable house.

The cable house preferably includes two upright opposed parallel plates spaced from one another and having opposed forward end portions. A rotatable drum-like member is mounted between the opposed forward end portions of the parallel plates, and is held in frictional engagement therebetween. The drum preferably has raised portions on either end allowing the ends to be snapped into opposed circular receptacles in the forward portions of the opposed upright plates.

For each cable there is a preferably transaxial passageway through the drum, starting at an inner opening which receives the cable from the cable house and terminating in an outer opening from which the cable emerges from the cable house. The rotational orientation of the drum determines the direction at which the cable or cables extend from the foot control device.

The inner opening or openings are preferably positioned such that rotation of the drum does not substantially change their position(s). That is, they are generally near the axis of the drum as defined by the circular receptables in the forward end portions of the plates.

Cable guides, preferably pulleys, are positioned within the cable house to guide the cables toward the inner openings in the drum. If the preferred pulleys are used, they are rotatably mounted on a shaft extending between the two plates.

The cable house preferably includes a cover member which has a window adjacent to the forward end portions of the upright plates. The window is positioned to expose the drum and allow the cables to exit the cable house. In preferred embodiments, a yoke outside the cover is attached to the drum through the window. The yoke secures the cable or cables as they exit the drum and serves to provide a stop during rotational adjustment of the drum. This protects the cable from impacting the window edge during adjustments.

The drum can be rotated about a substantially horizontal axis through a substantial arc, allowing the cable to exit the cable house in any direction in a vertical plane between nearly straight forward and nearly straight up. The latter orientation allows the foot control device to be placed against a forward bulkhead or other structure which would otherwise have been an obstruction.

This invention greatly increases the size of the available area at which the foot control device can be placed to accommodate the needs of the operator. This invention provides a foot control device which requires a reduced amount of floor space. In that sense the foot control device of this invention is certainly more compact than many prior devices.

The device illustrated in the drawings and described in greater detail below, which embodies this invention, is also the subject of concurrently-filed copending patent application on another invention. That application Ser. No. 602,773, file Apr. 23, 1984, entitled "Outboard Motor Foot Control," was filed by William Lagerquist, Del Decko, and Eugene P. Menne.

OBJECTS OF THE INVENTION

An object of this invention is to provide an improved foot control device for outboard motors.

Another object of this invention is to provide a portable foot control device for bow-mounted electric trolling motors and other outboard motors which has greater flexibility in where it may be placed on a boat floor during operation.

Another object of this invention is to provide a portable foot control device for outboard motors which can be placed closely against obstructions like forward bulkheads in a boat.

Another object of this invention is to provide a foot control device for outboard motors which takes less space on the floor of a boat.

These and other important objects will be apparent from the following description of preferred embodiments of the invention and from the accompanying drawings wherein:

BRIEF DESCRIPTION OF THE DRAWINGS

FIG. 2 is top plan view with a portion of the cable house casing cutaway to expose working parts.

FIG. 3 is a front elevation.

FIG. 4 is a partial right side sectional view taken along section 4—4 as shown in FIG. 2, with the cable house casing entirely removed.

FIG. 5 is a partial right side sectional view taken along section 5—5 as shown in FIG. 2, with the cable house casing entirely removed.

DETAILED DESCRIPTION OF PREFERRED EMBODIMENTS

Figure 1:
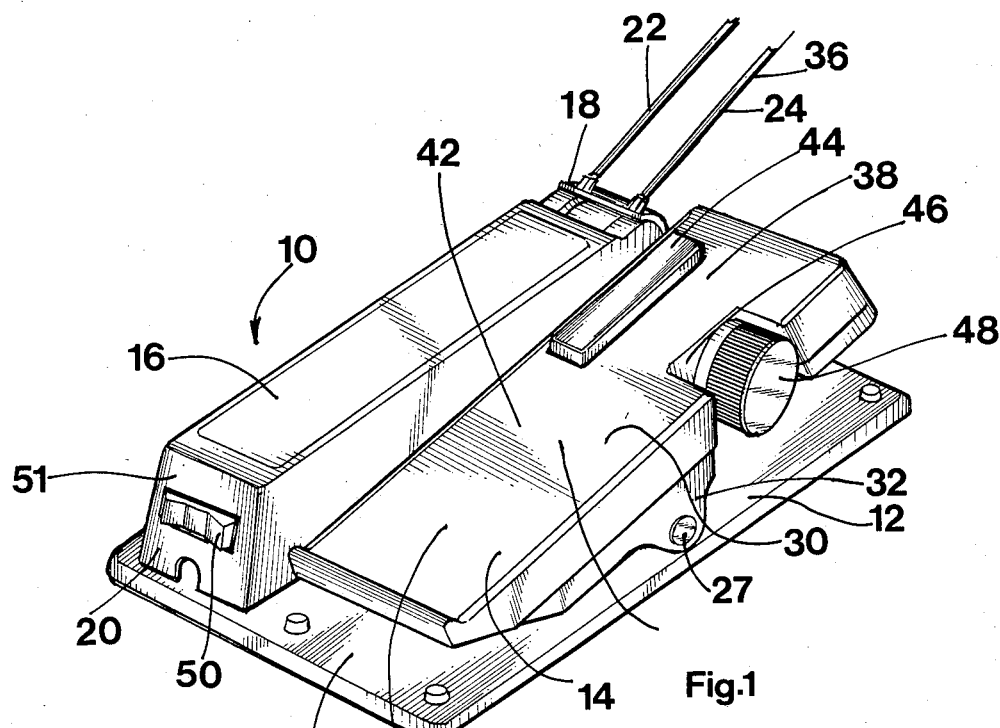
FIG. 1 is a perspective view of a foot control device in accordance with this invention taken generally from a rear position.

The figures illustrate outboard motor foot control device 10 in accordance with this invention. Foot control device 10 includes a base 12, a pedal 14, and a cable house 16 having a front end 18 and a rear end 20. A first cable 22 and a second cable 24 extend from front end 18 of cable house 16.

As illustrated best in FIG. 3, pedal 14 is mounted pivotably to upright portions 26 of base 12 by pivot pins 27, and such pivotable mount defines a horizontal pivot axis just above the main upper surface 28 of base 12. Pedal 14 includes a foot-contact surface 30, which is spaced substantially above the horizontal axis defined by pivot pins 27, and downwardly extending side portions 32 which are apertured to accommodate pivot pins 27.

Foot-contact surface 30 of pedal 14 includes a forward portion 38, a rearward portion 40, and a center portion 42 which is the part of foot-contact surface closest to the pivot axis of pedal 14. On forward portion 38 is a momentary switch 44 which is slightly raised above foot-contact surface 30 and located to one side. On the other side of foot-contact surface 30, exposed through a notch 46 in surface 30, is a cylindrical speed control knob 48.

Momentary switch 44 and control knob 48 are connected by appropriate mechanical and electrical devices not shown to perform their intended functions. Depression of momentary switch 44 may be used to actuate an electric outboard motor to which control 10 is attached, and speed control knob controls the speed of the motor. A three-way switch 50 mounted on rear end 20 of cable house 16 and electrically connected by appropriate means not shown is used to turn the motor "off" or to turn it to either a continuous "on" position or to a position allowing operation of momentary switch 44.

Movement of pedal 14 in forward or rearward directions moves the inner cable portions 34 of first and second cables 22 and 24 through the mechanical device to be hereafter described, most of which is within cable house 16. First cable 22 and second cable 24 are within their sheathings 36 as they exit cable house 16.

As best illustrated by FIG. 2, cable house 16 includes a cover 51 shielding the inner working parts. FIGS. 2, 4 and 5 illustrate two vertical opposed plates 52 which are in spaced parallel planes perpendicular to the pivot axis of pedal 14. Opposed plates 52 are the opposite leg portions of a U-shaped metal piece the bottom 54 of which is attached to base 12. First and second cables 22 and 24 are strung on two sets of pulleys arranged between opposed plates 52.

Attached to the pivot pin 27 which is adjacent to cable house 16 and extending into cable house 16 along the axis defined by pivot pins 27 is a pivot shaft 56 which is affixed to pedal 14 and turns therewith. Pivot shaft 56 extends through both of the plates 52 and is journaled therein.

A lever arm 58 is fixed to pivot shaft 56 between plates 52 and is oriented at a right angle to pivot shaft 56. Lever arm 58 extends in a generally upward direction from the point of its attachment to pivot shaft 56 and is free to move between forward and rearward positions as determined by the position of pedal 14.

At the distal end 60 of lever arm 58 are first and second pulleys 62 and 64, each of which are rotatably mounted on a shaft 66 as illustrated in FIGS. 4 and 5. First and second pulleys 62 and 64 are on opposite sides of lever arm 58. First and second pulleys 62 and 64 can move with lever arm 58 between forward and rearward positions.

The end 68 of first cable 22 is secured by a pin 69 to one of the plates 52 at a first position in front of first pulley 62. The end 70 of second cable 24 is secured by a pin 71 to the other of the plates 52 at a second position to the rear of second pulley 64. Also to the rear of second pulley 64 is a third pulley 72 which is rotatably mounted on shaft 74 which extends between plates 52 and is parallel to pivot shaft 56 and shaft 66. Another parallel shaft 76 extends between plates 52 to rotatably mount first and second guide pulleys 78 and 80.

First cable 22 extends from the first position, where it is secured, in a rearward direction to and around first pulley 62 and from there forward to first guide pulley 78 which serves to guide it toward its exit from cable house 16, as illustrated in FIG. 4. As shown in FIG. 5, second cable 24 extends from the second position, where it is secured, in a forward direction to and around second pulley 64 and from there in a rearward direction to and around third pulley 72 and from there in a forward direction to second guide pulley 80 which serves to guide second cable 24 toward its exit from cable house 16.

Each of the cables is generally in a plane within cable house 16 and such planes are parallel. Furthermore, pin 69, first pulley 62 and first guide pulley 78 are in alignment in a fore-to-aft direction. Likewise, pin 71, second pulley 64, third pulley 72 and second guide pulley 80 are in alignment in a fore-to-aft direction.

In operation, movement of pedal 14 in a forward direction moves lever arm 58 and first and second pulleys 62 and 64 in a forward direction. Such movement results in the pulling of second cable 24 and the corresponding payout of first cable 22. Movement of pedal 14 in a backward direction moves lever arm 58 and first and second pulleys 62 and 64 in a rearward direction, which results in the pulling of first cable 22 and the corresponding payout of second cable 24. These cable movements produce the desired steering, and do so with ease and accuracy.

Figure 6:
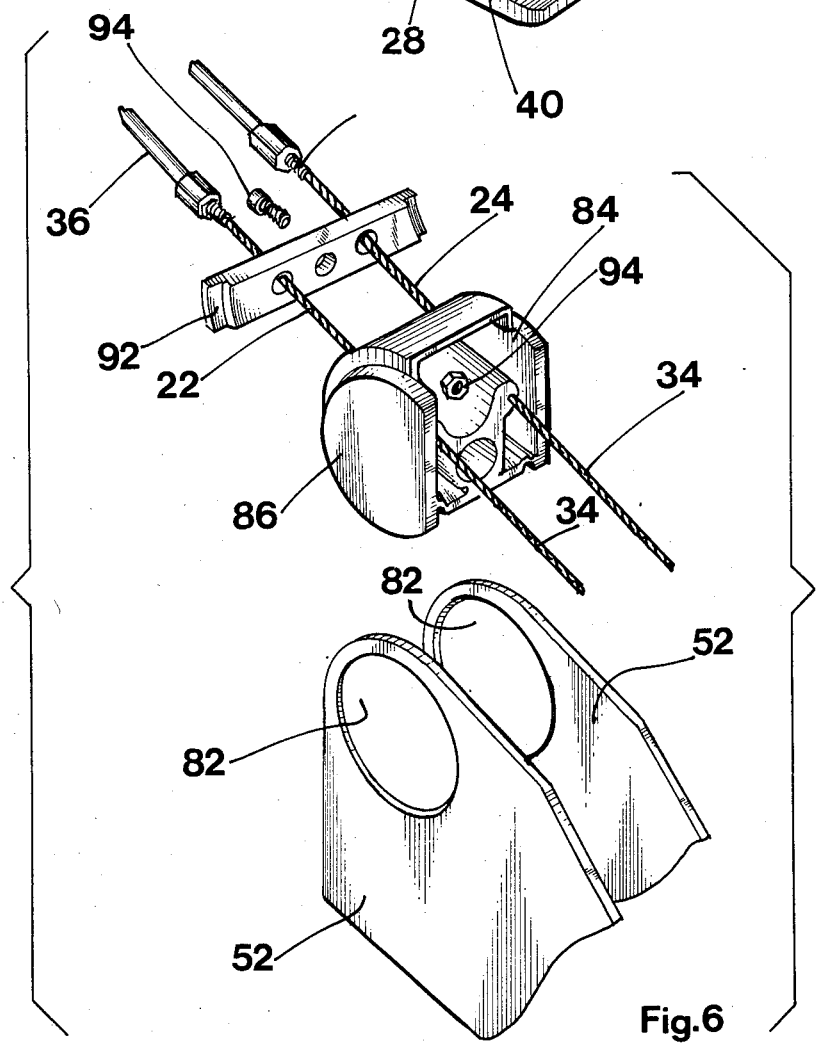
FIG. 6 is an exploded fragmentary view of a portion of the cable house, illustrating the inventive apparatus for adjustment of the direction of cables exiting the cable house.

As shown in FIGS. 4, 5 and 6, the forward portions of the opposed plates 52 have broad circular opposed receptacles 82 between which a drum 84 is held in tight frictional engagement. Drum 84 has raised center portions 86 on its ends which are snapped into opposed receptacles 82 and serve to hold drum 84 in place.

Drum 84 has two transaxial passageways 88, one in line with each of the cables. Cables 22 and 24 extend through passageways 88 and their direction in exiting cable house 16 is set by the rotational orientation of drum 84 about a substantially horizontal axis to firmly orient cables 22 and 24 in various directions in a vertical plane.

A forward opening 90 is defined in cover 51 to expose drum 84 and allow cables 22 and 24 to exit cable house 16. A yoke 92 outside cover 51 is attached to drum 84 by means of a bolt 94 and nut 95. The sheathings 36 of cables 22 and 24 are secured to the outer surface of drum 84 by means of bolts 96 which are engaged directly with drum 84. Yoke 92 has openings to accommodate the heads of bolts 96.

Yoke 92 and drum 84 move together. Yoke 92 is in sliding frictional engagement with cover 51 at a recessed portion thereof 98 which is concentric with the adjacent cylindrical surface of drum 84. The engagement of yoke 92 with the ends of recessed portion 98 provides stops which limit the movement of drum 84.

This arrangement serves to protect the cables during adjustment of the rotational position of drum 84 and yoke 92. Drum 84 may be adjusted as needed without concern for interfering with the operation of the cable system.

The drum can be rotated to point passageways 88 and cables 22 and 24 in a nearly vertical direction or in a horizontal direction or any direction between these extremes. The operator sets the cable direction to suit his needs, taking into account where he is sitting in the boat, the presence of a bulkhead or other structural portion of the boat, and the space available. The foot control device works equally well in any orientation of the cables.

The parts of this invention are preferably made of metal or strong plastic. Appropriate materials would be apparent to those skilled in the art who are made familiar with this disclosure.

While in the foregoing specification this invention has been described in relation to certain preferred embodiments and many details have been set forth for purpose of illustration, it will be apparent to those skilled in the art that the invention is susceptible to additional embodiments and that certain of the details described herein can be varied considerably without departing from the basic principles of the invention.

What is claimed is:

1. In a portable outboard motor foot control device of the type having a base, a pedal mounted thereto pivotably about an axis, and at least one cable extending therefrom toward the motor, the improvement comprising:
   (a) a cable house secured to the base adjacent to the pedal, said at least one cable being secured within said cable house and exiting said cable house to extend toward the controlling motor and
   (b) adjustable means rotatable about a substantially horizontal axis through a substantial arc on the cable house to set the direction of said at least one cable as it exits the cable house to firmly orient said at least one cable in various directions in a vertical plane as necessary to avoid nearby obstacles.

2. The foot control device of claim 1 wherein the cable house comprises two substantially vertical opposed plates spaced from one another and having opposed forward end portions, and the adjustable means comprises a drum member having means on its opposite ends in frictional engagement with the opposed forward end portions and having passageway means receiving said at least one cable from the cable house and directing said at least one cable upon exiting the cable house, the rotational orientation of the drum being adjustable to set the direction of the at least one cable.

3. The foot control device of claim 2 wherein the forward portions define circular receptacles and wherein the engaging means includes raised portions received within the receptables.

4. The foot control device of claim 2 wherein said passageway means has an inner opening positioned such that it remains in substantially unchanged position during rotational adjustment of the drum, whereby only the orientation of the passageway means changes upon rotational adjustment.

5. The foot control device of claim 4 wherein cable guide means are supported between the opposed plates within the cable house and positioned to guide the at least one cable toward the inner opening in the drum.

6. The foot control device of claim 5 wherein the cable guide means comprises a pulley for each cable rotatably supported on a shaft extending between the plates.

7. The foot control device of claim 4 wherein the forward portions define circular receptacles and wherein the engaging means includes raised portions received within the receptables.

8. The foot control device of claim 7 wherein the cable house further comprises a cover member defining a window adjacent to the forward end portions exposing the drum, and a yoke outside the cover and attached to the drum through the window, said yoke securing said at least one cable and providing a stop to protect the at least one cable during rotational adjustment of the drum.

9. The food control device of claim 2 wherein the cable house further comprises a cover member defining a window adjacent to the forward end portions exposing the drum, and a yoke outside the cover and attached to the drum through the window, said yoke securing said at least one cable and providing a stop to protect the at least one cable during rotational adjustment of the drum.

10. The foot control device of claim 1 wherein there are two cables.

11. The foot control device of claim 10 wherein the cable house comprises two substantially upright opposed parallel plates spaced from one another and having opposed forward end portions, and the adjustable means comprises a drum member having means on its opposite ends in frictional engagement with the opposed forward end portions and having passageways receiving said cables from the cable house and directing said cables upon exiting the cable house, the rotational orientation of the drum being adjustable to set the direction of the passageways and cables.

12. The foot control device of claim 11 wherein the forward portions define circular receptacles and wherein the engaging means includes raised portions received within the receptacles.

13. The foot control device of claim 11 wherein each passageway has an inner opening positioned such that it remains in substantially unchanged position during rotational adjustment of the drum, whereby only the orientation of the passageway changes upon rotational adjustment.

14. The foot control device of claim 13 wherein cable guide means are supported between the opposed plates within the cable house at a position to guide the cables toward the inner opening in the drum.

15. The foot control device of claim 14 wherein the cable guide means comprises a pulley for each cable rotatably supported on a shaft extending between the plates.

16. The foot control device of claim 15 wherein the forward portions define circular receptacles and wherein the engaging means includes raised portions received within the receptacles.

17. The foot control device of claim 16 wherein the cable house further comprises a cover member defining a window adjacent to the forward end portions exposing the drum, and a yoke outside the cover and attached to the drum through the window, said yoke securing said cables and providing a stop to protect the cables during rotational adjustment of the drum.

18. The foot control device of claim 11 wherein the cable house further comprises a cover member defining a window adjacent to the forward end portions exposing the drum, and a yoke outside the cover and attached to the drum through the window, said yoke securing said cables and providing a stop to protect the cables during rotational adjustment of the drum.

* * * * *